US012771402B2

(12) United States Patent
Ramesh et al.

(10) Patent No.: US 12,771,402 B2
(45) Date of Patent: Oct. 20, 2026

(54) METHOD TO CAPTURE AND DECODE DATA TRANSFER BETWEEN NETWORKED DEVICES USING OSCILLOSCOPE

(71) Applicant: Tektronix, Inc., Beaverton, OR (US)

(72) Inventors: P. E. Ramesh, Bangalore (IN); Praharsha P Sirsi, Bangalore (IN)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 18/612,443

(22) Filed: Mar. 21, 2024

(65) Prior Publication Data

US 2024/0322857 A1 Sep. 26, 2024

(30) Foreign Application Priority Data

Mar. 23, 2023 (IN) ............................. 202321020488

(51) Int. Cl.
*H04L 27/00* (2006.01)
*H04B 1/713* (2011.01)
*H04L 27/14* (2006.01)

(52) U.S. Cl.
CPC ............. *H04B 1/713* (2013.01); *H04L 27/14* (2013.01)

(58) Field of Classification Search
CPC ...... H04B 1/713; H04B 1/715; H04B 1/7156; H04L 5/023; H04L 27/201; H04W 16/02; H04W 52/322; H04W 52/44
USPC .......................................................... 375/136
See application file for complete search history.

(56) References Cited

U.S. PATENT DOCUMENTS

| | | | | |
|---|---|---|---|---|
| 10,079,699 B1* | 9/2018 | Li | H04L 27/10 |
| 2012/0257604 A1* | 10/2012 | Honkanen | H04W 76/14 370/338 |
| 2013/0028353 A1* | 1/2013 | Park | H04B 1/001 375/340 |
| 2018/0231501 A1* | 8/2018 | Findikoglu | G01N 29/4472 |
| 2020/0328776 A1* | 10/2020 | Scholand | H04B 1/715 |
| 2021/0219283 A1* | 7/2021 | Xue | H04W 72/20 |
| 2023/0028353 A1* | 1/2023 | Suzuki | G02F 1/13737 |

* cited by examiner

*Primary Examiner* — Khai Tran
(74) *Attorney, Agent, or Firm* — Miller Nash LLP; Andrew J. Harrington

(57) ABSTRACT

A test and measurement system for a frequency-hopping communication system includes a radio frequency antenna structured to receive a signal from a frequency-hopping data transmitting device including at least two frames of data in which the at least two frames of data are sent at two or more unique radio frequencies, and a decoder structured to decode the at least two frames of data without prior knowledge at which radio frequencies the frequency-hopping device were to be sent. Methods are also described.

20 Claims, 8 Drawing Sheets

900

| | Seq_Number | Prea... | LAP | UAP | NAP | PacketType | HeadControl | Paylength | Accesscode | Payload |
|---|---|---|---|---|---|---|---|---|---|---|
| 1 | 1 | 010101 | 108CC8 | 2E | 4A21 | DM3 | 1 0 0 | 789 | 2AAAAA554A2119969 | F0455E90C6A67C945CDDFB6584780E275A0ABD... |
| 2 | 2 | 010101 | 119954 | 9F | 8C42 | ID | 0 0 0 | 0 | 32AAA9548C42332A9 | |
| 3 | 3 | 010101 | 884CC8 | B9 | C621 | HV1 | 0 1 0 | 10 | 5555554C621332D3 | EA1BE4A2E6EFDB2C23C0 |
| 4 | 4 | 101010 | 119963 | A2 | C621 | NULL | 1 0 1 | 0 | 96AA9654C62119963 | |
| 5 | 5 | 010101 | 21154B | C2 | 1884 | DM3 | 0 1 1 | 263 | 55555531884652D3 | 7091DFB6584780E275A0ABD218D4CF9288988F8... |
| 6 | 6 | 101010 | 2129A6 | 47 | 1884 | HV1 | 1 1 1 | 10 | AA9AA5551884A72D3 | 13E0157A431A99F25173 |
| 7 | 7 | 101010 | 108CC8 | D0 | 8C42 | EV4 | 1 1 0 | 0 | AAAAAAA98C42332D3 | |
| 8 | 8 | 101010 | 42332D | 88 | C621 | ID | 0 0 0 | 0 | F5555554C62119963 | |
| 9 | 9 | 010101 | 101998 | FC | 8C40 | NULL | 1 1 1 | 0 | 55552AA98C40665A6 | |
| 10 | 10 | 010101 | 42332D | 31 | 8C42 | FHS | 0 1 1 | 18 | 155555518C42332D3 | 9C88E1157A431A99F2517377ED9611E0388D |
| 11 | 11 | 010101 | 42332D | 82 | 8C42 | DV | 0 0 1 | 22 | 155555298C42332D3 | F66651C3A982C23C0713055E90C6A67C945CDD... |
| 12 | 12 | 010101 | 211995 | A4 | 8C42 | DV | 0 0 1 | 22 | 2AAAAAA98C42332AA | FE55AE38A8E2C23C0713055E90C6A67C945CDD... |
| 13 | 13 | 101010 | 108898 | B7 | 8C42 | DM3 | 1 1 0 | 156 | AAAAAAA98C42265A6 | F9515E90C6A67C945CDDFB6584780E275A0ABD... |
| 14 | 14 | 101010 | 108CC8 | 01 | 8C42 | HV3 | 0 0 1 | 30 | AAAAAAA98C42332D3 | 88548CF86A4A2E6EFDB2C23C0713AD095E90C6... |
| 15 | 15 | 010101 | 108CC8 | 1A | C621 | NULL | 1 0 0 | 0 | 2AAAAA54C62119969 | |
| 16 | 16 | 010101 | 42332D | 45 | 1884 | HV1 | 1 1 1 | 10 | 2AAAAA951884665A6 | C124157A431A99F25173 |
| 17 | 17 | 010101 | 211996 | 37 | C621 | ID | 0 0 0 | 0 | 15555554C62119969 | |
| 18 | 18 | 010101 | 212A48 | FA | 8C42 | DM3 | 1 0 0 | 317 | 2AAAD2AA8C4255566 | 58555E90C6A67C945CDDFB6584780E275A0ABD... |
| 19 | 19 | 010101 | 211996 | 76 | 2884 | HV1 | 1 1 1 | 10 | 555A9953288466A6 | D2BB06F01C4EB4157A43 |
| 20 | 20 | 010101 | 42332D | C5 | 1884 | ID | 0 0 0 | 0 | 2AAAAA5531884665A6 | |
| 21 | 21 | 101010 | 211995 | E6 | 1884 | DM5 | 0 1 0 | 93 | AAAAAA5318846653 | 73533E4A2E6EFDB2C23C0713AD095E90C6A67C... |
| 22 | 22 | 010101 | 84665A | 57 | 1884 | DM1 | 0 0 0 | 6 | 1555555318846665A6 | 3D6091DFB658 |
| 23 | 23 | 010101 | 42332D | CA | 8C42 | EV4 | 0 1 0 | 0 | 155555498C42332D3 | |
| 24 | 24 | 101010 | 108CC6 | 7F | 8C42 | EV4 | 1 1 1 | 0 | AAAAAAA98C42331AA | |
| 25 | 25 | 101010 | 422A98 | AE | 8C42 | DM1 | 1 1 1 | 23 | EAAAAAA98C422A969 | 7344157A431A99F2517377ED9611E0388D682AF4... |
| 26 | 26 | 010101 | 84665A | 14 | 8C42 | DM1 | 1 0 1 | 4 | 0AB2AAA98C42332D3 | 91AC53DF |
| 27 | 27 | 101010 | 42332D | 71 | 8C42 | ID | 0 0 0 | 0 | EAAAAAA98C42332D3 | |
| 28 | 28 | 101010 | 411996 | DE | 9462 | HV1 | 1 1 0 | 10 | D55555529482332D3 | 1014157A431A99F25173 |
| 29 | 29 | 101010 | 022AAA | 1A | C884 | DM1 | 1 0 0 | 12 | D5555552C884552D3 | 225D065E90C6A67C945CDDF8 |
| 30 | 30 | 010101 | 211947 | B2 | 8C42 | HV1 | 0 0 1 | 10 | 2AAAB4A98C42332D3 | 6F38E0388D682AF48635 |

FIG. 9

METHOD TO CAPTURE AND DECODE DATA TRANSFER BETWEEN NETWORKED DEVICES USING OSCILLOSCOPE

CROSS-REFERENCE TO RELATED APPLICATIONS

This disclosure claims priority under 35 U.S.C. § 119 to Indian Provisional Patent Application No. 202321020488, filed Mar. 23, 2023, titled "METHOD TO CAPTURE AND DECODE DATA TRANSFER BETWEEN NETWORKED DEVICES USING OSCILLOSCOPE," the disclosure of which is incorporated herein by reference in its entirety.

TECHNICAL FIELD

The present disclosure relates generally to encoded wireless communications, and, more particularly, to capturing and decoding wireless data transfer between networked devices using an oscilloscope.

BACKGROUND

Bluetooth™ is global wireless standard that enables connectivity for a wide range of electronic devices ranging from mobile phones to medical devices, computers, and healthcare equipment. Bluetooth™ eliminates the need for the cable connection between the devices and connecting over short distance using short wavelength transmission in unlicensed industrial scientific and medical band spanning between 2.4 and 2.48 GHz.

Bluetooth™ operating in the 2.4 GHz band employs 79 Radio Frequency (RF) channels for basic and enhanced data rate transmissions. To combat the narrow band interference and fading in the 2.4 GHz band, Bluetooth™ employs frequency hopping spread spectrum (FHSS). The frequency hops follow pseudo-random pattern with uniform probability across all 79 channels. During an active Bluetooth™ connection, both the transmitter and receiver have knowledge of the pseudorandom frequency hopping pattern, which is determined based on the clock of the master device and certain bits of the Bluetooth address.

A Bluetooth™ device already in a communication network with other Bluetooth™ devices, which is referred to as a piconet, has knowledge about the next channel frequency while it is decoding the current channel frequency. Conversely, devices outside of the piconet do not have access to the pseudorandom frequency hopping pattern, and therefore cannot decode Bluetooth™ communications.

Accordingly, there is a need for a system for capturing and decoding wireless data transmissions from a device that uses frequency hopping without a priori knowledge of the frequency hopping pattern being used by the device.

BRIEF DESCRIPTION OF ACCOMPANYING DRAWINGS

FIG. 9 illustrates the decoding of the complete bluetooth transaction messages, in accordance with the present disclosure.

DETAILED DESCRIPTION

Embodiments according to the disclosure provide a system and method for capturing and decoding data transfer between networked devices that are communicating using a wireless, frequency hopping network protocol with an oscilloscope that is not a part of the wireless network. More particularly, embodiments use a type of Fourier analysis to determine an approximate frequency of the RF signal that represents a data packet, and then a refining process determines the exact starting point of the data packet. Next a polynomial that was used to perform a whitening process on the data packet prior to encoding the packet is determined using a brute-force method. Then the data packet can be decoded using this information. Although the description below is given with reference to communication that uses a Bluetooth™ protocol for communication, embodiments according to this disclosure may be used with any frequency-hopping protocol, such as Wi-Fi (IEEE 802.11), cordless telephones, some walkie-talkies, and baby monitors, for example.

Figure 1:
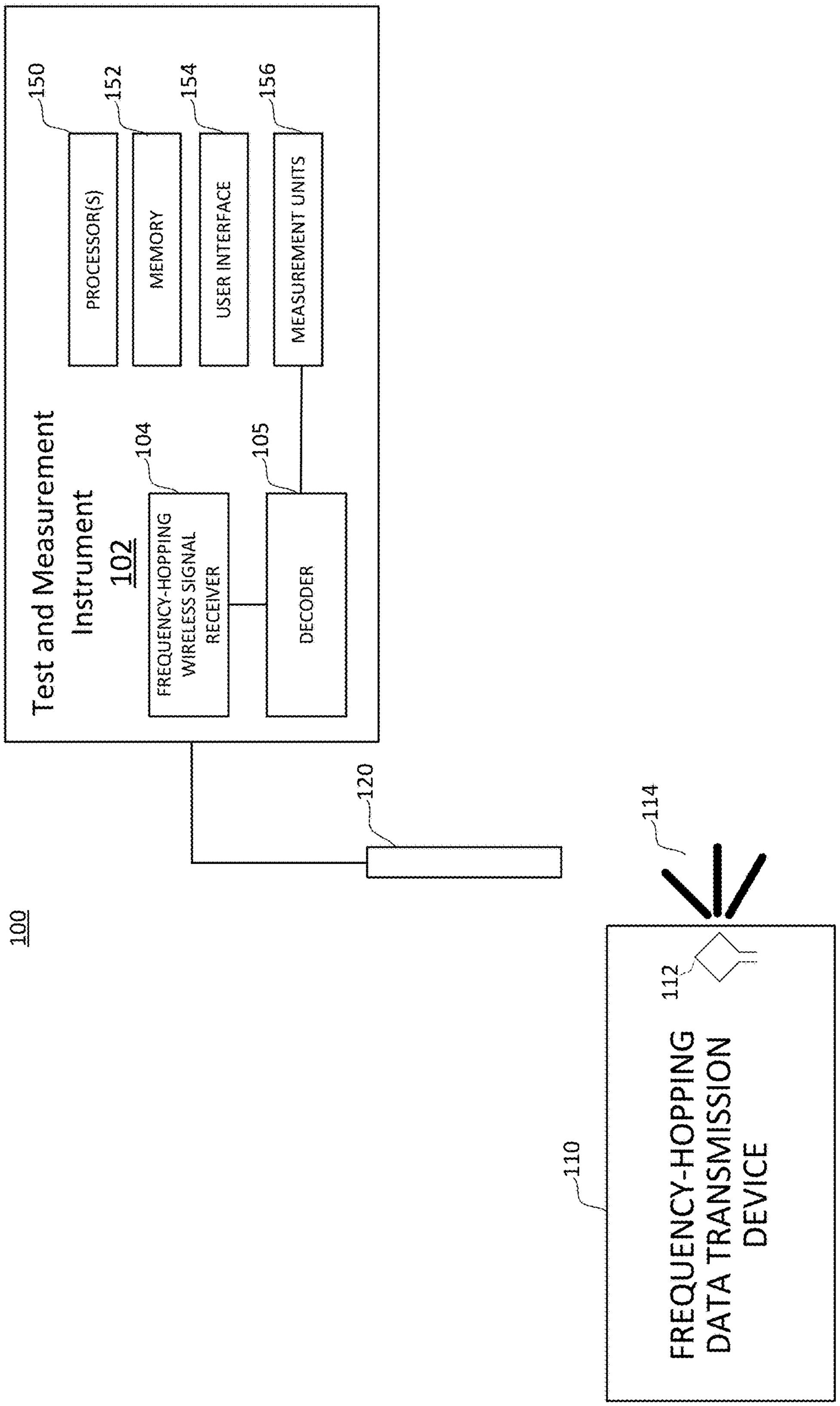
FIG. 1 illustrates a test and measurement system including a test and measurement instrument having an antenna for receiving data carried by RF signals using frequency hopping, memory to store the received RF signals as a waveform, and a decoder for decoding data in accordance with some embodiments of the present disclosure.

FIG. 1 is a block diagram of a test and measurement system 100 including a test and measurement instrument 102, such as an oscilloscope, that includes a wireless signal receiver 104 for detecting RF signals from an RF transmitting device, and particularly from an RF transmitting device that uses frequency hopping, in accordance with embodiments of the present disclosure. The wireless signal receiver 104 receives wireless signals at a given center frequency and has a frequency span that enables all of the signals of interest to be captured by the instrument 102. The receiver 104 is coupled to a decoder 105, which operates to decode packets of data carried by the RF signals that were captured by the receiver. Detailed description of the operation of the receiver 104 and the decoder 105 with other components of the test and measurement system 100 appears below.

The test and measurement instrument 102 also includes one or more main processors 150 that may be configured to execute instructions from main memory 152 and may perform any methods and/or associated steps indicated by such instructions. Portions of memory 152 may also be configured as a waveform memory to store waveform data acquired by the instrument 102. Portions of memory 152 may also store other data. A user interface 154 is coupled to the one or more processors 150 and may include, for example, a keyboard, mouse, touchscreen, output display, file storage, and/or any other controls employable by a user to interact with the test and measurement instrument 102. In some embodiments the user interface 154 may be connected to or controlled by a remote interface (not illustrated), so that a user may control operation of the instrument 102 in a remote location physically away from the instrument. A display portion of the user interface 154 may be a digital screen such as an LCD, or any other monitor to display waveforms, measurements, and other data to a user. In some embodiments, the main output display of the user interface 154 may also be located remote from the instrument 102.

One or more measurement units 156 perform the main functions of measuring parameters and other qualities of signals from the devices being measured by the instrument 102. Typical measurements include measuring voltage, current, and power of input signals in the time domain, as well as measuring features of the input signals in the frequency domain. The measurement units 156 represent any measurements that are typically performed on test and measurement instruments, and the receiver 104 and decoder 105 may be integrated within or coupled to such measurement units 156.

FIG. 1 also illustrates a frequency-hopping data transmission device 110 that includes an antenna 112. The antenna 112 is coupled to a data transmitter (not illustrated) within the data transmission device 110. In operation, the data transmission device 110 transmits data packets to another data transmission device (not illustrated), that is part of a piconet with the data transmission device 110. The data packets are transmitted through RF signals 114 emanating from the antenna 112. The data transmission device 110 sends signals to these other devices using a method of frequency-hopping, in which each data packet sent by the data transmission device 110 is sent at a frequency that is different from other data packets. All of the devices in the piconet have knowledge of which frequency the next data packet will be sent by the data transmission device 110, which they use to decode the sent data packets. As described in detail below, the instrument 102 is able to decode the data packets sent by the data transmission device 110 even though it is not part of the piconet network, using techniques according to embodiments.

A radio frequency (RF) probe, or antenna 120 is coupled to a testing input of the test and measurement instrument 102 and is suitably positioned proximate to at least one, and potentially all of the data transmission devices 110 in the piconet. The test and measurement instrument 102 captures the RF signals 114 as sensed by the RF antenna 120 in the time domain. After these RF signals have been captured by the instrument 102 as an input waveform, the receiver 104 stores the RF signals as a time-domain waveform. Additionally, the instrument 102 may also demodulate the incoming RF signal and store it as a demodulated in-phase and quadrature (IQ) waveform. Generally, this conversion is performed by applying a center frequency to the signal to derive the IQ components. The stored RF signal may also be decoded by the decoder 105, as described in detail below. Then the instrument 102 may display the decoded responses on the user interface 154 for the user, or the instrument may create one or more data files that store the decoded data. In this way the user may use the instrument 102 to decode the RF signals 114 that were generated by the data transmission device 110 in a manner not possible previously. In other words, previously, only devices that are part of the piconet could decode the data packets sent by the data transmission device 110, because only the devices that were part of the piconet have knowledge of which frequency each subsequent data packet will be transmitted. Embodiments according to the disclosure, however, have developed a methodology to decode the data packets, for example, by the instrument 102, even though the instrument is not part of the piconet.

Figure 2:
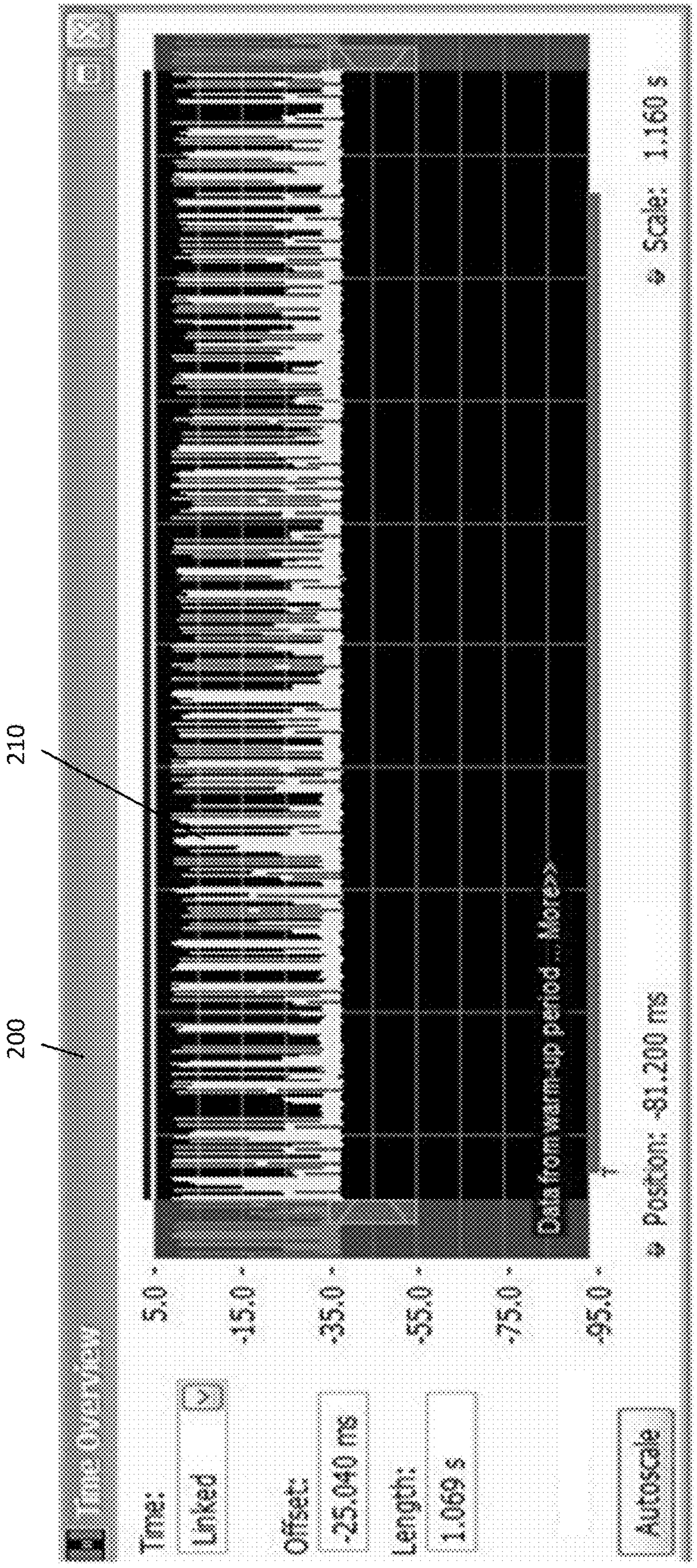
FIG. 2 is an output display illustrating RF signals in the time domain as captured by the instrument of FIG. 1 in accordance with the present disclosure.

FIG. 2 illustrates an example output display 200 illustrating RF signals 210 in the time domain as captured by the instrument 102 of FIG. 1 in accordance with the present disclosure. Each of the spikes in the RF signals 210 is a separate data packet sent by, for example, the data transmission device 110 of FIG. 1, or any data transmission device that uses frequency-hopping as a method of sending data. The instrument 102 has no prior knowledge of a center frequency for subsequent packets, which can be any one of the unique transmission channels used by the protocol that the data transmission device 110 uses. For the Bluetooth™ protocol, for instance, there are 79 separate channels with 1 MHz spacing in the band between 2.40 GHz and 2.48 GHz, and each packet may be sent on any of these 79 channels.

Figure 3:
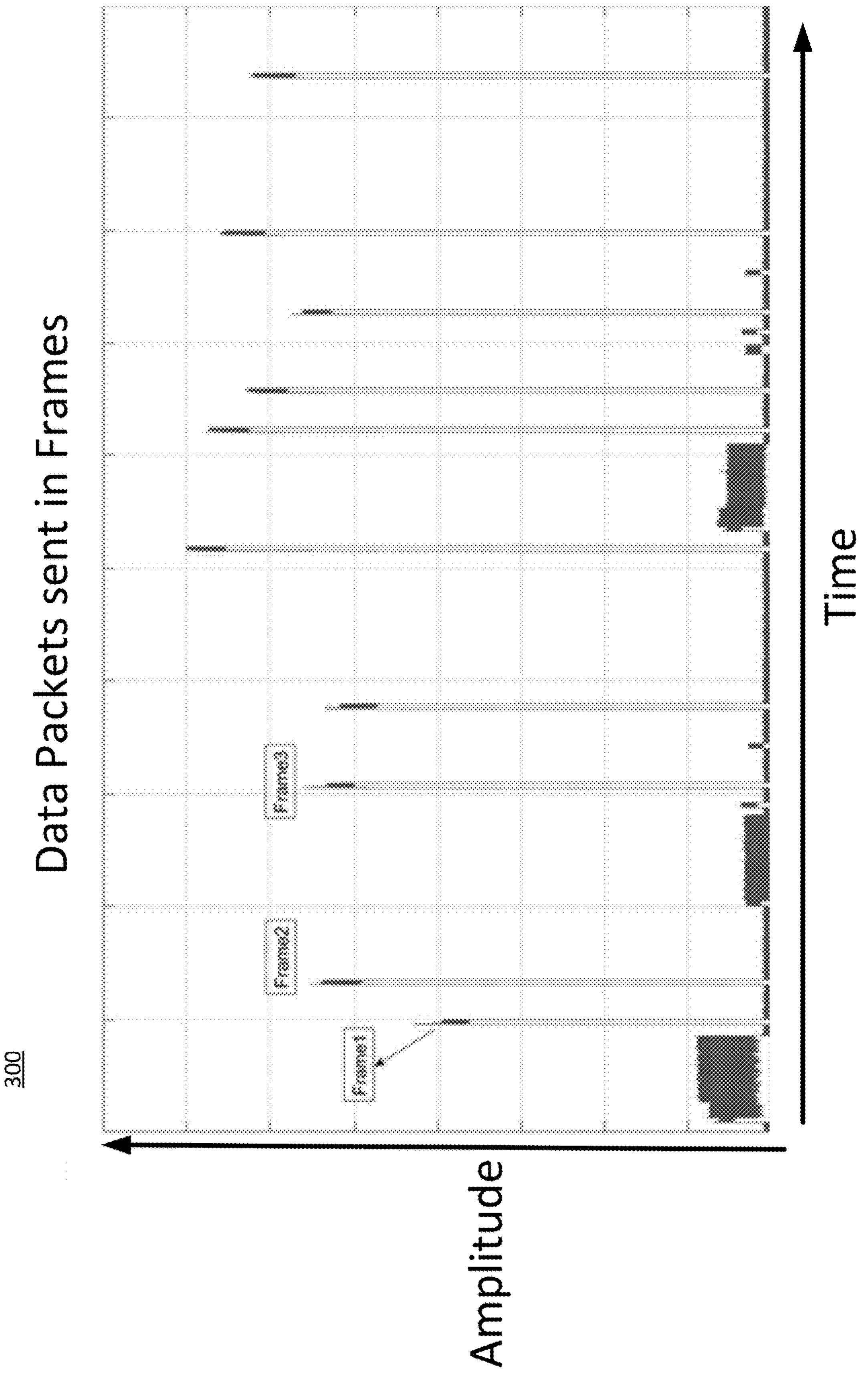
FIG. 3 illustrates a time-based display of a series of RF signals where each spike in the series represents a frame of data in which a center frequency for each frame is unknown, according to embodiments of the disclosure.

FIG. 3 illustrates a display 300 of a series of RF signals in the time domain captured by the instrument 102 (FIG. 1), where each spike in the series represents a frame of data in which a center frequency for each frame is unknown.

Figure 4B:
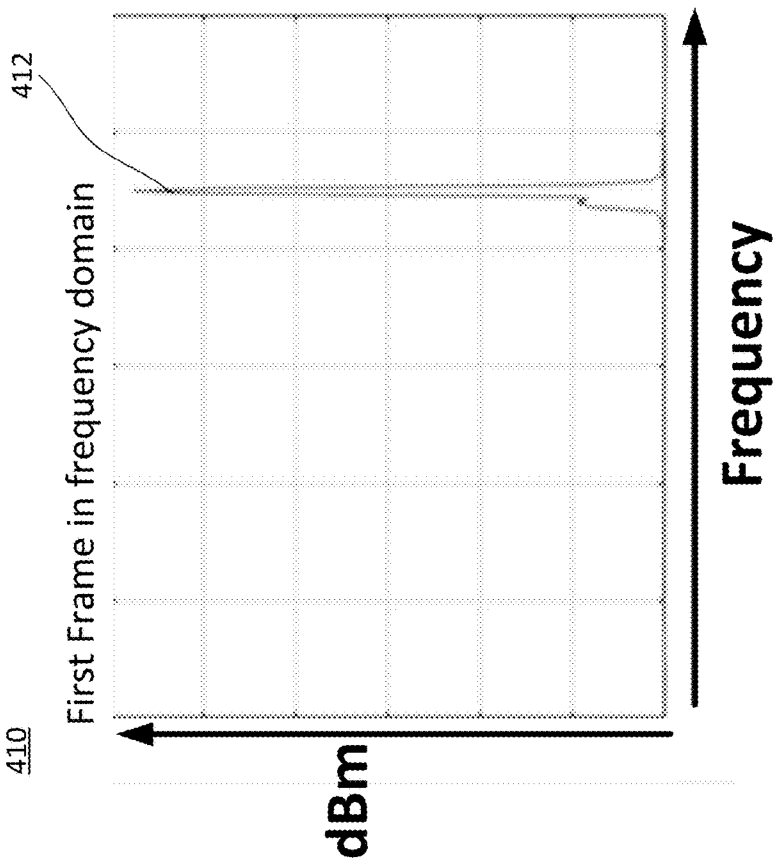
FIG. 4B is a display of an example RF signal indicating the single data frame of FIG. 4A sent from a wireless device in the frequency domain, in accordance with the present disclosure.
Figure 4A:
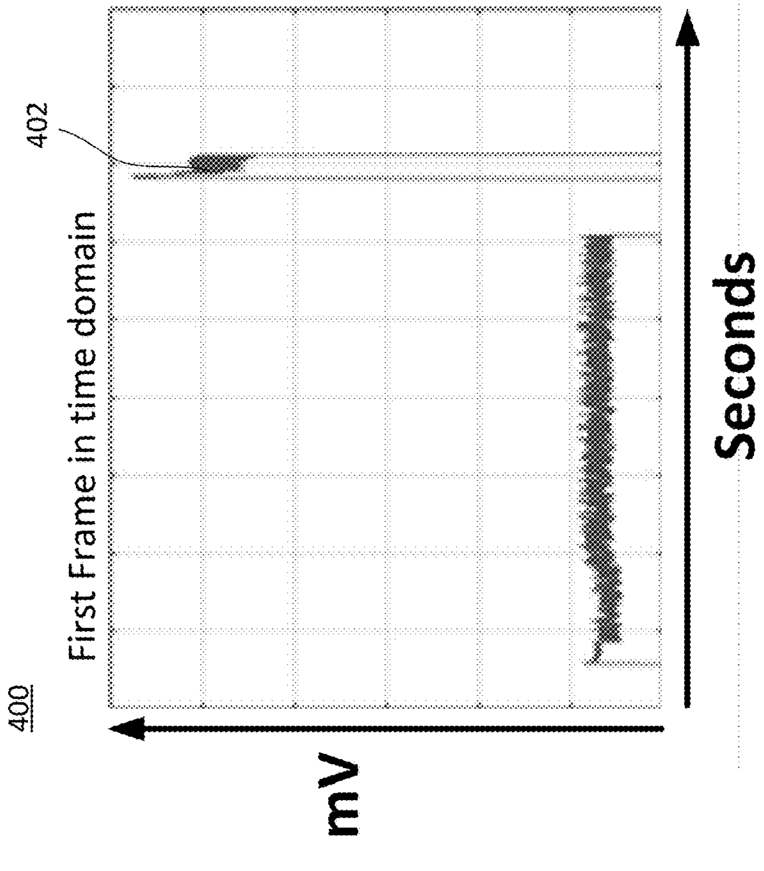
FIG. 4A is a display of an example RF signal indicating a single data frame sent from a wireless device in the time domain, in accordance with the present disclosure.

FIGS. 4A and 4B are time and frequency displays 400, 410, respectively, of a first frame isolated from the series of RF signals of FIG. 3. A spike 402 in the time domain display 400 indicates a data transmission unit sent by the data transmission device 110, which is referred to as a frame, or data frame, while a spike 412 in the frequency domain display 410 indicates the center frequency of the same data frame.

Each frame of data sent by the data transmission device 110 has a different center frequency. Also, each frame is encoded with an unknown coding. Embodiments according to the disclosure first determine the center frequency of each frame sent by the data transmission device 110. Then, each packet is decoded as described in detail below. Information that is available to the instrument 102 by capturing the RF waveform includes not only the timing of each data packet, as described above, but also includes a demodulated waveform in the form of an IQ waveform that is generated by the instrument 102 from the captured RF signal. In practice, the RF signal detected by the antenna 120 of the instrument 102 (FIG. 1) is converted by the test and measurement instrument 102 into its I (in-phase) and Q (quadrature) components, which is commonly called an IQ waveform. Generally, this conversion is performed by applying a center frequency to the signal to derive the IQ components. This IQ waveform is stored in the memory, such as the waveform memory 152 of the instrument 102, and is used to help decode the data packets sent by the data transmission device 110.

A first step in decoding the incoming data packets is to identify the center frequency for each of the packets captured by the instrument 102. Each frame has a different center frequency, which is determined by some of the address bits of the master device in the piconet. But, since the instrument 102 is not part of the piconet, it does not know at which particular frequency, i.e., channel, on which the next data packet is transmitted. Embodiments according to the disclosure are able to determine the center frequency of the data packets using new techniques.

Figure 5:
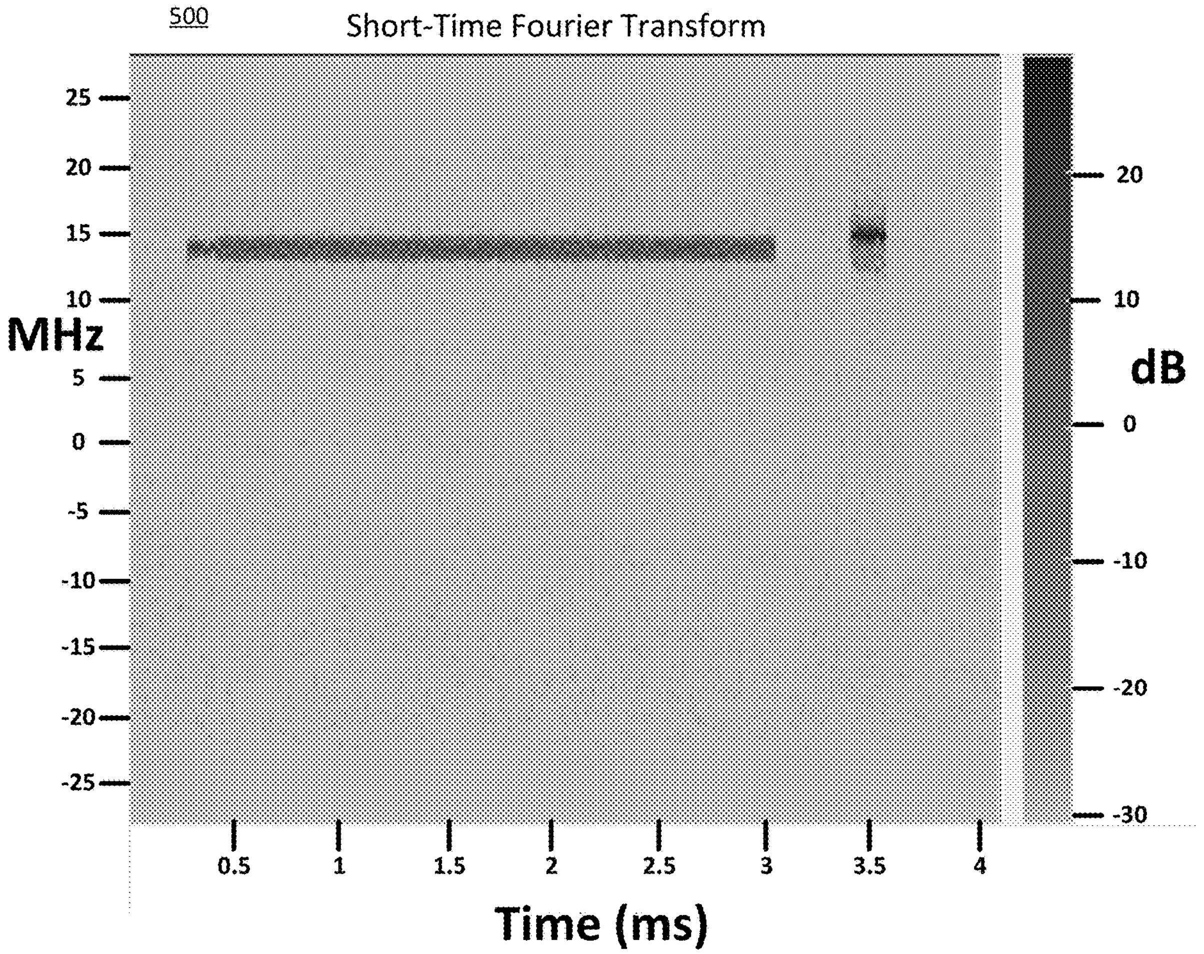
FIG. 5 is a display of a short-time Fourier Transform of the RF signal representing a single data frame that provides information about a center frequency of the RF transmission of that frame, in accordance with the present disclosure.

One method of determining the center frequency of a data packet is to produce a short-time Fourier transform (STFT) of the RF signal containing the packet to analyze how the frequency content of a nonstationary signal changes over time. Both the time domain and the frequency domain of the signal in 3*d* form can be observed. FIG. 5 illustrates a spectrogram plot 500 of a STFT for the first data frame that was illustrated in FIGS. 4A and 4B, in accordance with the present disclosure. Using spectrogram 500 data, with help of rows, column, and magnitude data, an area of intensified region may be determined. In some embodiments the intensified region is determined using an edge finding algorithm in 2D space of the spectrogram 500. Once the intensified area is detected, a deviation value from a mean frequency value may be determined. With reference to FIG. 5, in the illustrated example, the center frequency was set to 2.46 GHz center frequency, and the spectrogram 500 illustrates an intensified portion at which the data frame was transmitted at approximately 15 MHz deviation from the center frequency. Therefore, adding the 15 MHz of the intensified portion to the center frequency of 2.46 GHz yields a center frequency for this frame at 2.4750 GHz.

This process described with reference to FIG. 5 is for a single frame in the acquired data. The same process is repeated for all the frames in the acquired waveform to detect the center frequency for each of the data frames. So, after the Short Time Fourier Transform has been performed for each of the data frames, what is known is the center frequency at which each of the data frames has been transmitted, and the IQ waveform is also known, as described above, which provides digital information of all of the data contained in all of the frames. But, since the digital values have been modulated prior to sending, the next process is to demodulate data in the each of the frames, which is described in detail below.

Figure 6:
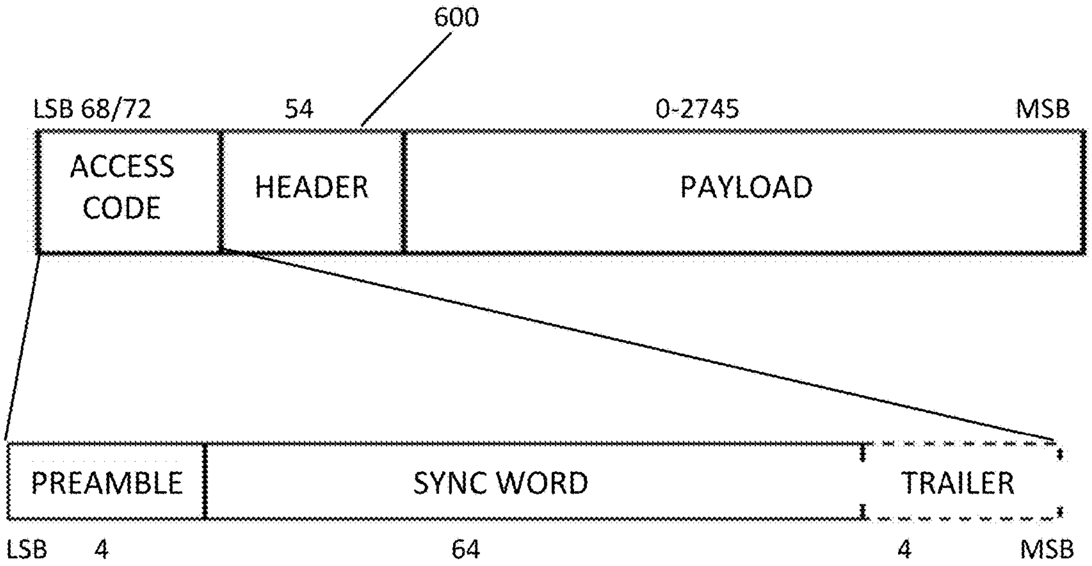
FIG. 6 illustrates a frame structure of a Bluetooth™ frame, which is used by embodiments of the present disclosure to decode a data frame transmitted by the device, in accordance with the present disclosure.

FIG. 6 illustrates the frame structure of a Bluetooth™ frame 600. As illustrated, the frame 600 includes an access code portion of either 68 or 72 bits, a 54-bit header, and a 0-2745 bit payload. The least significant bit (LSB) and the most significant bit (MSB) of the frame 600 are also indicated. The access code portion is further broken into component parts including a 4-bit preamble, a 64-bit synch word, and an optional 4-bit trailer, depending on whether the access code is shortened or normal in length.

Individual bits of the Bluetooth™ frame 600 are modulated using Gaussian Frequency Shift Keying (GFSK) having a relatively low +/−200 kHz frequency offset variation from the center frequency of the frame. Recall from above that the center frequency of each frame is determined, at a general level, using the Short Time Fourier Transform described above with reference to FIG. 5. Embodiments of the disclosure use another process to find the exact first bit of the Bluetooth™ frame 600, so that the remainder of the frame 600 may be demodulated correctly.

While decoding the Bluetooth™ frame 600 using the instrument 102 (FIG. 1), the preamble is used, as the preamble of a Bluetooth™ frame is a fixed code that is either 0101 or 1010, depending on the LSB of the sync word that immediately follows the preamble. But, because the preamble of the Bluetooth™ frame 600 is very short, i.e., only 4 bits in length, there is a possibility of identifying the wrong bit received in the data frame as the starting bit.

Since the Bluetooth™ frame 600 is modulated using GFSK, as described above, it is possible to evaluate the frequency deviation for each symbol interval individually to determine the exact starting bit of the Bluetooth™ frame 600.

Figure 7:
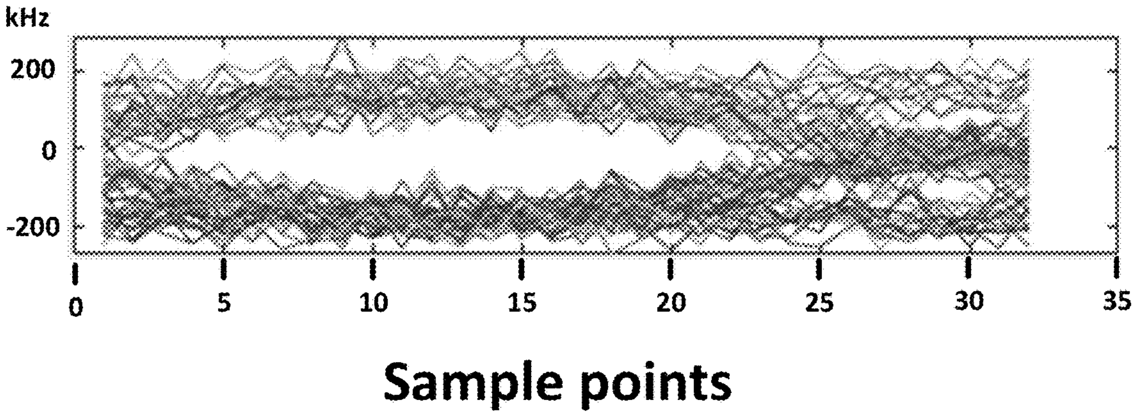
FIG. 7 is an eye diagram plot of the frequency deviation for each analyzed symbol interval in the preamble portion of the Bluetooth™ frame that is used to decode the data frame transmitted by the device, in accordance with the present disclosure.

FIG. 7 is an eye diagram plot of the frequency deviation for each evaluated symbol interval in the preamble portion of the Bluetooth™ frame that is used to decode the data frame transmitted by the device, in accordance with the present disclosure. With reference back to FIG. 4B, the beginning and ending of each frame is determined by analyzing the time domain data of the RF waveform recorded by the instrument 102 (FIG. 1). The beginning point of each frame is where the large spike occurs, and the ending point of each frame is where the large spike ends. The signals between the beginning and the ending of each frame contain the data in each Bluetooth™ frame 600.

In accordance with embodiments, a process of determining the exact starting point of the Bluetooth™ frame 600 begins by plotting the frequency deviation for each symbol interval, which forms the eye diagram illustrated in FIG. 7. The signal is locked on to where it starts to form the first symbol that exceeds the mean frequency deviation in the GFSK modulation. In this way, the location of the preamble, as well as the sync word can be determined. So, beginning somewhere in the middle of the frame, the frequency deviation for each symbol interval is plotted and analyzed. In the middle of the frame, it is expected that there will be frequency deviation, as illustrated in FIG. 7. Then the next previous symbol interval is checked. If there is still frequency deviation, then the process proceeds to the next previous symbol. Eventually, when the symbol interval matches the beginning of the frame, there will be no frequency deviation in the plot. By using this method, there is a very high likelihood of finding the exact LSB of the Bluetooth™ frame 600. In other words, by starting at the middle of the frame, it is assumed that there will be frequency deviation. But, by working one bit at a time toward the beginning of the frame, at some point the frequency deviation becomes a straight line, which precisely locates the exact beginning of the Bluetooth™ frame 600.

Once the start and end of the Bluetooth™ frame 600 is identified, and after compensating the center frequency correction, the portion of the IQ waveform in the frame is demodulated. After the exact beginning of the Bluetooth™ frame 600 is identified, then the sync word is located, which immediately follows the 4 preamble bits (FIG. 6). Contained within the sync word is a 24-bit lower address part (LAP.)

The remainder of the Bluetooth™ frame 600, other than the access code portion, may be scrambled with a data whitening word to randomize the data from redundant patterns and to minimize Direct Current (DC) bias in the frame transmission. If the Bluetooth™ frame 600 is scrambled, the scrambled portions include the packet header as well as the payload (FIG. 6). The packet header contains contain link information of 18 bits of Header Error Control (HEC) encoded with ⅓ Forward Error Correction (FEC) resulting in 54-bit header. The remainder of the Bluetooth™ frame 600 contains the payload.

Figure 8:
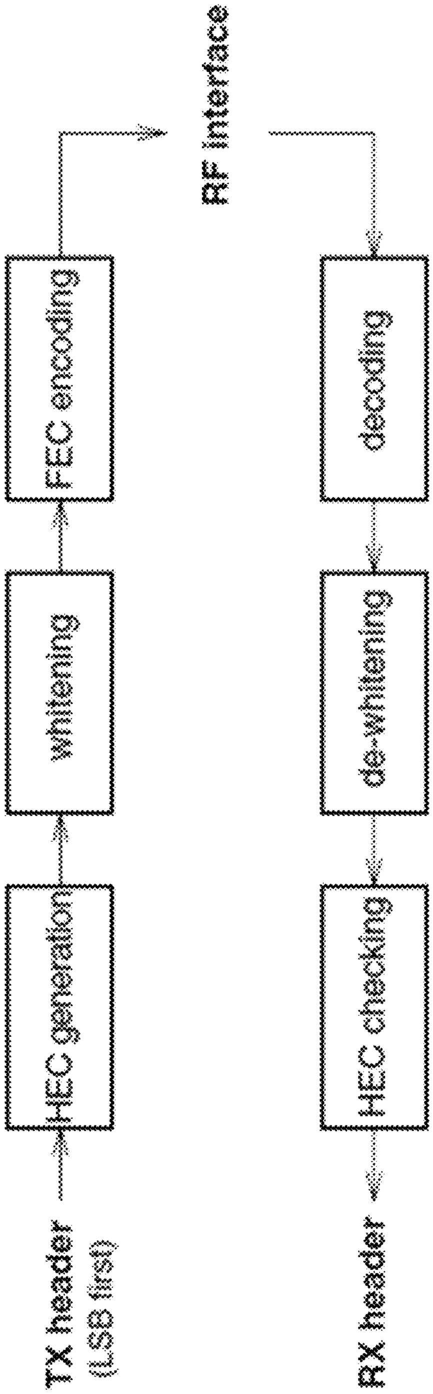
FIG. 8 illustrates a whitening and de-whitening process that is decoded in accordance with methods of the present disclosure.

Data whitening as part of the transmission process is illustrated in FIG. 8. As described above, first the HEC is generated prior to the whitening word to be applied, which scrambles the data transmission. Then FEC is applied, which helps the receiver properly decode the Bluetooth™ packet 600 even when transmission errors occur. The RF interface illustrated in FIG. 8 refers to the sending antenna 112 (FIG. 1) as well as a receiving antenna, which, in this disclosure is the antenna 120 of the instrument 102. The remainder of the processes illustrated in FIG. 8 are performed by the receiver. Or, in accordance with embodiments disclosed herein, by the instrument 102 (FIG. 1).

Decoding the received Bluetooth™ packet 600 as illustrated in FIG. 8 means decoding the data that was encoded by FEC. The type of FEC encoding in Bluetooth™ networks is known, and the instrument 102 (FIG. 1) decodes the data by according to the Bluetooth™ protocol. The de-whitening process may be more complicated, since the whitening word, and therefore the de-whitening word, is derived from the LAP. In a Bluetooth™ device that is part of the piconet, the data whitening word is known to the Bluetooth™ devices. Embodiments of the invention may determine the whitening word by a brute-force process. In other words, since the data whitening polynomial in a Bluetooth™ device is given by:

$g(D)=D^5+D^4+1$, where $D^5$ and $D^4$ are the $4^{th}$ and $5^{th}$ numbers of the polynomial, then all possible combinations of the LAP may be generated by the instrument 102 to find the correct polynomial that de-scrambles the Bluetooth™ frame 600, including the payload.

FIG. 9 illustrates a report 900 that includes an example decoding of 30 Bluetooth™ data frames, in accordance with the present disclosure. Since the memory 152 of the instrument 102 (FIG. 1) is quite large, a complete Bluetooth transaction can be acquired by the instrument and stored for the decoding and analysis, as described above. The report 900 includes all portions of the Bluetooth™ data frames, including the access code, header, and payload as illustrated in FIGS. 6 and 9. As described above, the report 900 may be shown on a display of the instrument 102 (FIG. 1), or may be generated as an output file for analysis or other uses.

Embodiments according to the disclosure provide a system and methods to, using an oscilloscope or other test and measurement instrument, acquire and decode a complete transaction of a Bluetooth conversation, or other frequency-hopping protocol, without being part of the communication network. Also, embodiments allow for testing and verifying frequency-hopping sequences in communication networks.

The above-described mechanism used to find start and end of the frame using an eye diagram prevents the locking to wrong start of the frame using preamble. Also, the brute force mechanism of finding the LAP and creating whitening sequence enable embodiments to decode the payload and header, which has not been previously possible without being part of the network, as typically only members of the network have the whitening code available.

Aspects of the disclosure may operate on particularly created hardware, on firmware, digital signal processors, or on a specially programmed general-purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. The operations described above may be performed by particular hardware or combinations of hardware and software. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or non-volatile, removable or non-removable media implemented in any technology. Computer storage media excludes signals per se and transitory forms of signal transmission.

EXAMPLES

Illustrative examples of the technologies disclosed herein are provided below. A configuration of the technologies may include any one or more, and any combination of, the examples described below.

Example 1 is directed to a test and measurement system for a frequency-hopping communication system, the test and measurement system including a radio frequency antenna structured to receive a signal from a frequency-hopping data transmitting device including at least two frames of data in which the at least two frames of data are sent at two or more unique radio frequencies, and a decoder structured to decode the at least two frames of data without prior knowledge of the two or more unique radio frequencies at which the frequency-hopping data transmitting device sent the at least two frames of data.

Example 2 is directed to a test and measurement system according to Example 1, further comprising a short-time Fourier transform processor structured to determine the two or more unique radio frequencies.

Example 3 is directed to a test and measurement system according to Example 2, in which the short-time Fourier transform processor is structured to determine a deviation frequency for each of the two or more unique radio frequencies.

Example 4 is directed to a test and measurement system according to any of the preceding Examples, further comprising a gaussian frequency shift key processor.

Example 5 is directed to a test and measurement system according to Example 4, in which the gaussian frequency shift key processor is configured to determine a frequency deviation for a plurality of symbol intervals contained in at least one of the at least two frames of data.

Example 6 is directed to a test and measurement system according to any of the preceding Examples, further comprising an In-phase Quadrature (IQ) processor structured to decode the signal received from the frequency-hopping data transmitting device.

Example 7 is directed to a test and measurement system according to Example 6, in which the signal received from the frequency-hopping data transmitting device is stored as an IQ waveform and as a time-domain waveform.

Example 8 is directed to a test and measurement system according to any of the preceding Examples, further comprising a polynomial extractor structured to determine a whitening word used to scramble the at least two frames of data.

Example 9 is directed to a test and measurement system according to any of the preceding Examples, in which the frequency-hopping data transmitting device transmits the at least two frames of data according to a Bluetooth™ protocol.

Example 10 is directed to a test and measurement system according to any of the preceding Examples, further comprising a memory structured to store the decoded at least two frames of data in a list indexed by frame number.

Example 11 is a method of decoding, in a test and measurement instrument, at least two frames of data sent from a frequency-hopping data transmitting device, including receiving through a radio frequency antenna a signal from the frequency-hopping data transmitting device including at least two frames of data in which the at least two frames of data are sent at two or more unique radio frequencies, and decoding the at least two frames of data without prior knowledge of prior knowledge of the two or more unique radio frequencies at which the frequency-hopping data transmitting device sent the at least two frames of data.

Example 12 is a method according to Example 11, further comprising determining the two or more unique radio frequencies using a short-time Fourier transform processor.

Example 13 is a method according to any preceding Example methods 11-12, further comprising, with the short-time Fourier transform processor, determining a deviation frequency for each of the two or more unique radio frequencies.

Example 14 is a method according to any preceding Example methods 11-13, further comprising determining a frequency deviation for a plurality of symbol intervals contained in at least one of the at least two frames of data with a gaussian frequency shift key processor.

Example 15 is a method according to any preceding Example methods 11-14, further comprising decoding the signal from the frequency-hopping data transmitting device using an In-phase Quadrature (IQ) processor.

Example 16 is a method according to Example 15, further comprising storing the signal from the frequency-hopping data transmitting device in the instrument as an IQ waveform and as a time-domain waveform.

Example 17 is a method according to any preceding Example methods 11-16, further comprising determining a whitening word used to scramble the at least two frames of data with a polynomial extractor.

Example 18 is a method according to any preceding Example methods 11-17, in which the frequency-hopping data transmitting device transmits the at least two frames of data according to a Bluetooth™ protocol.

Example 19 is a method according to any preceding Example methods 11-18, further comprising storing the decoded at least two frames of data in a list indexed by frame number.

The foregoing description has been set forth merely to illustrate example embodiments of present disclosure and is not intended to be limiting. Since modifications of the disclosed embodiments incorporating the substance of the invention may occur to person skilled in the art, the invention should be construed to include everything within the scope of the invention.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples. Each feature disclosed in the specification, including the claims, abstract, and drawings, can be replaced by alternative features serving the same, equivalent, or similar purpose, unless expressly stated otherwise.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

We claim:

1. A test and measurement device for decoding data sent from a first device in a frequency-hopping wireless communication system to a second device in the wireless communication system without the test and measurement system being part of the wireless communication system itself, the test and measurement device comprising:

- a radio frequency antenna structured to receive a wireless signal from one of the first device or the second device, the wireless signal including at least two frames of data in which the at least two frames of data are sent at two or more unique radio frequencies;
- a waveform memory to store the wireless signal as a waveform; and
- a decoder coupled to the memory and structured to decode the at least two frames of data from the stored waveform without prior knowledge of the two or more unique radio frequencies at which the first device sent the at least two frames of data.

2. The test and measurement device according to claim 1, further comprising a short-time Fourier transform processor structured to determine a transmission frequency for each of the two or more unique radio frequencies.

3. The test and measurement device according to claim 2, in which the short-time Fourier transform processor is structured to determine the transmission frequency for each of the two or more unique radio frequencies by determining a deviation frequency from a common center frequency for each of the two or more unique radio frequencies.

4. The test and measurement device according to claim 3, further comprising a gaussian frequency shift key processor.

5. The test and measurement device according to claim 4, in which the gaussian frequency shift key processor is configured to determine a starting location of the at least two data frames of data by analysing frequency deviation for a plurality of symbol intervals contained in at least one of the at least two frames of data.

6. The test and measurement device according to claim 1, further comprising an In-phase Quadrature (IQ) processor structured to decode the received signal.

7. The test and measurement device according to claim 6, in which the received signal is stored in the waveform memory as an IQ waveform and as a time-domain waveform.

8. The test and measurement device according to claim 1, further comprising a polynomial extractor structured to determine a whitening word used to scramble the at least two frames of data.

9. The test and measurement device according to claim 1, in which the first device transmits the at least two frames of data according to a Bluetooth™ protocol.

10. The test and measurement device according to claim 1, further comprising a data memory structured to store the decoded at least two frames of data in a list indexed by frame number.

11. The test and measurement system according to claim 1, further comprising a display for showing the stored waveform.

12. A method of decoding, in a test and measurement instrument that is not a part of a frequency-hopping wireless communication system, at least two frames of data sent from a first device in the wireless communication system to a second device in the wireless communication system, the method comprising:

receiving, through a radio frequency antenna, a signal from one of the first device or the second device, the signal including at least two frames of data in which the at least two frames of data are sent at two or more unique radio frequencies;

storing the signal in a waveform memory as a stored waveform; and decoding the at least two frames of data from the stored waveform without prior knowledge prior knowledge of the two or more unique radio frequencies at which the first device sent the at least two frames of data.

13. The method according to claim 12, further comprising determining a transmission frequency for each the two or more unique radio frequencies using a short-time Fourier transform processor.

14. The method according to claim 13, further comprising, with the short-time Fourier transform processor, using a deviation frequency from a common center frequency to determine a transmission frequency for each of the two or more unique radio frequencies.

15. The method according to claim 12 further comprising determining a starting location of the at least two data frames of data by analysing frequency deviation for a plurality of symbol intervals contained in at least one of the at least two frames of data with a gaussian frequency shift key processor.

16. The method of claim 12, further comprising decoding the signal from the first device using an In-phase Quadrature (IQ) processor.

17. The method according to claim 16, further comprising storing the decoded signal in the instrument as an IQ waveform and as a time-domain waveform.

18. The method according to claim 12, further comprising determining a whitening word used to scramble the at least two frames of data with a polynomial extractor.

19. The method according to claim 12, in which the first device transmits the at least two frames of data according to a Bluetooth™ protocol.

20. The method according to claim 12, further comprising storing the decoded at least two frames of data in a list indexed by frame number.

* * * * *